Dec. 28, 1965  T. E. CURTIS ETAL  3,226,499
LOAD BREAK SWITCH GEAR
Filed Dec. 3, 1962  6 Sheets-Sheet 1

INVENTORS.
Thomas E. Curtis
BY Marion A. Gebhardt

ATTORNEYS.

Dec. 28, 1965   T. E. CURTIS ETAL   3,226,499
LOAD BREAK SWITCH GEAR
Filed Dec. 3, 1962   6 Sheets-Sheet 2

INVENTORS.
Thomas E. Curtis
BY Marion A. Gebhardt
ATTORNEYS.

INVENTORS.
Thomas E. Curtis
BY Marion A. Gebhardt

Hovey, Schmidt, Johnson & Hovey.
ATTORNEYS.

Dec. 28, 1965

T. E. CURTIS ETAL 3,226,499

LOAD BREAK SWITCH GEAR

Filed Dec. 3, 1962

INVENTORS.
Thomas E. Curtis
BY Marion A. Gebhardt

ATTORNEYS.

Dec. 28, 1965     T. E. CURTIS ETAL     3,226,499
LOAD BREAK SWITCH GEAR Filed Dec. 3, 1962     6 Sheets-Sheet 5

INVENTORS.
Thomas E. Curtis
BY Marion A. Gebhardt

Hovey, Schmidt, Johnson & Hovey.
ATTORNEYS.

Dec. 28, 1965  T. E. CURTIS ETAL  3,226,499
LOAD BREAK SWITCH GEAR

Filed Dec. 3, 1962  6 Sheets-Sheet 6

INVENTORS.
Thomas E. Curtis
BY Marion A. Gebhardt

ATTORNEYS.

United States Patent Office 3,226,499
Patented Dec. 28, 1965

3,226,499
LOAD BREAK SWITCH GEAR
Thomas E. Curtis, Centralia, Mo., and Marion A. Gebhardt, Cedar Rapids, Iowa, assignors to A. B. Chance Company, Centralia, Mo., a corporation of Missouri
Filed Dec. 3, 1962, Ser. No. 241,745
15 Claims. (Cl. 200—48)

This invention relates to improvements in switch gear of the class described in McBride et al., U.S. Letters Patent No. 3,070,680, granted December 25, 1962.

It is the primary object of this invention to provide an improved embodiment of switch gear of the type described in the aforesaid patent wherein a plurality of air-break switches are utilized in combination with a single load interrupting switching device. More specifically, an object of the present invention is the provision of an improved auxiliary switching means for interconnecting each air-break switch with the load interrupter during opening of the air-break switches.

Another specific object of the present invention is to provide an improved load interrupting switching device employing a plurality of serially connected vacuum-break interrupters. In carrying forth this object, tandem operation of any number of vacuum-break interrupters is provided whereby the transmission line voltages that may be interrupted are greatly increased.

Another specific object of this invention is the provision of means whereby switch gear of the class described in the aforesaid patent may be effectively shielded from the effects of adverse weather during operation.

Still another specific object of the present invention relates to improvements in vacuum-break interrupters whereby initial contact acceleration during opening of the interrupter is reduced.

Other objects will become apparent as the detailed description proceeds.

The switching concepts embraced by the present invention are disclosed in the aforesaid patent which is incorporated herein by reference as may be necessary for a complete understanding of the nature and general manner of operation of the instant invention. However, before proceeding with a description of the improvements embodied in this invention over the aforesaid patent, a brief description of the basic over-all concepts associated with this invention will first be reviewed.

Figure 14:
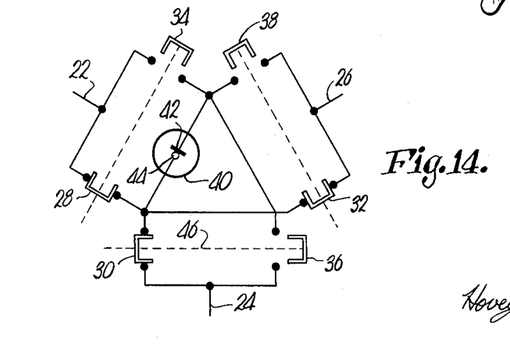
FIG. 14 is a schematic diagram showing the switching configuration of the present invention.

Referring to FIG. 14, three transmission lines 22, 24 and 26 are shown interconnected by the switching apparatus of the present invention. This apparatus comprises main switches 28, 30 and 32, auxiliary switches 34, 36 and 38, and load interrupter 40. The main switches are of the air-break type to be fully described hereinafter. The auxiliary switches function as transfer devices and close during the opening of the main switches to transfer the current path through the load interrupter. Load interrupter 40 is of the vacuum-break type and contains a pair of separable contacts 42 and 44. It may be observed from FIG. 14 that when it is desired to maintain all of the lines 22–26 interconnected, the main switches 28–32 are maintained in the closed position. Conversely, at such time the auxiliary switches 34–38 are maintained in the open position. Load interrupter 40 is normally closed.

Assuming for purposes of illustration that transmission line 22 emanates from a power distribution station and that the lines 24 and 26 comprise feeder lines leading to points of power consumption or distribution, the status of the circuitry will, of course, be as described in the preceding paragraph. Should it be desired, for example, to disconnect feeder line 24 from line 22, then the following events would occur in sequence:

(a) Actuating mechanism (not shown) would commence the opening of main switch 30.

(b) Prior to main switch 30 assuming the "completely" open position wherein the electrical circuit therethrough is interrupted, auxiliary switch 36 would be closed. In the diagram, the mechanical coupling between switches 30 and 36 is illustrated at 46. Furthermore, it may be seen that the closing of switch 36 creates a current path from line 22 to line 24, through switch 28, interrupter 40, and switch 36. At this point, a circuit still exists from line 22 through switch 28 and switch 30 to line 24. Therefore, it may be seen that switches 30 and 36, when switch 36 is closed, create parallel paths for the flow of electrical current from line 22 to line 24, as well as being mechanically interconnected.

(c) Main switch 30 is now fully opened and thus the auxiliary switch 36 now carries the full current through line 22 and 24. The single current path between lines 22 and 24 is now routed through load interrupter 40.

(d) The separable contacts 42 and 44 of interrupter 40 are now opened to thereby break the circuit between lines 22 and 24.

By viewing the circuit arrangement shown in FIG. 14, it may be appreciated that this switching circuitry allows a single interrupter capable of breaking the load current to be utilized where, prior to the teachings of the aforesaid patent, separate load interrupters were required for each line if it were desired to provide switch gear capable of handling the line load current.

For maximum versatility of this system means is provided to return the contacts 42 and 44 of the load interrupter to the closed position and to re-open the auxiliary switch 36 subsequent to the load-break operation above described. This would leave the circuitry of FIG. 14 as shown therein, except that main switch 30 would be in the open position. This permits subsequent closure of main switch 30 or operation of the switches associated with the other lines.

*Main and auxiliary switches*

Referring to FIGS. 1–4, the apparatus of the present invention is shown suitable for operation in conjunction with three transmission lines as illustrated schematically in FIG. 14. It should be understood at the outset that three of the units shown would be utilized in three phase power systems, each unit being coupled with a single phase. This principle is familiar in the sectionalizing switch gear art, such sectionalizing switches often being mounted one above the other on a power pole for control from the ground below by suitable operating means.

Main switches 28–32 are shown having switch blades 28a, 30a and 32a, respectively, and contact jaws 28b, 30b and 32b, respectively. Lugs or terminal pads 29, 31 and 33, respectively, are electrically connected to switch arms 28a, 30a and 32a to provide a connection means for the transmission lines. To coordinate the structural drawings with the schematic diagram of FIG. 14, it will be assumed for purposes of illustration, that line 22 is connected to lug 29, that line 24 is connected to lug 31, and that line 26 is connected to lug 33.

The switch blades 28a–32a are respectively mounted on rotary insulators 48, 50 and 52 for movement in a horizontal plane into and out of engagement with the corresponding contact jaws, The lugs 29, 31 and 33 are free to rotate about the axes of insulators 48, 50 and 52 so that the transmission line terminations may remain stationary when the insulators rotate. The bases of the rotary insulators are rotatably mounted on a frame generally designated 54, the frame being mounted to a power pole 56 by a suitable bracket device 58. Rotation of the rotary insulators is effected by crank arms 60 rigid with shafts 62 attached to the lowermost portions of the insulators and journaled on the frame 54. Suitable linkage structure (not shown) is attached to the crank arms so that personnel on the ground at the base of the power pole may selectively actuate any of the main switches. For further details in this regard, reference is made to the aforesaid patent, particularly FIGS. 1 and 2 thereof. The arrows in FIG. 1 of the patent illustrate the paths of travel of the switch blades away from their respective contact jaws. This movement is effected when it is desired to open a particular main switch. In the instant application the dashed lines in FIG. 2 for main switch 30 illustrate the position thereof when the switch is in the fully open position. It should be noted that in this position the contact jaw 30b is pivoted leftwardly from the closed position.

Figures 1, 4:
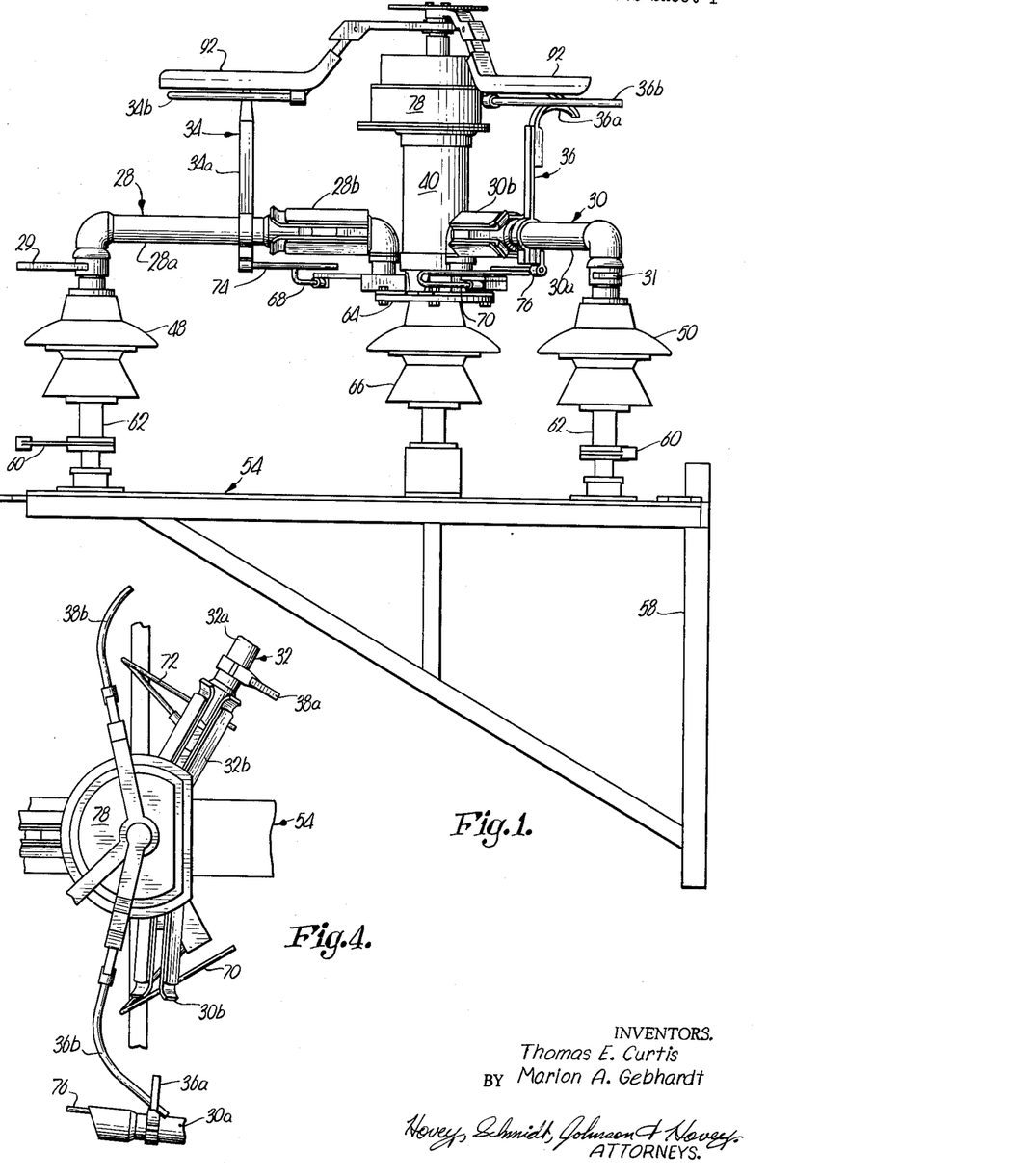
FIGURE 1 is a side elevational view of the present invention showing the air-break switches in the closed position.
FIG. 4 is a fragmentary, plan view similar to FIG. 3 but showing the opened air-break switch in a further condition of operation.

In FIG. 1, it may be seen that the contact jaws are journaled on a plate 64 mounted on a supporting insulator 66 which is in turn rigidly secured to the frame 54. The contact jaws are thus allowed limited swinging movement in a horizontal plane when the corresponding switch blades are disengaged therefrom. The mounting plate 64 also electrically interconnects the three contact jaws.

Contacting rods 68, 70 and 72 are rigidly secured to plate 64 adjacent contact jaws 28b, 30b and 32b, respectively. These rods are bent into a generally elongated, U-shaped configuration as shown in the figures for engagement with arcing horns connected to the respective switch blades when the main switches are in the closed position. The arcing horns for switch blades 28a and 30a are designated 74 and 76 respectively, and are disposed in parallel relationship thereto for movement with the switch blades. Switch blade 32a is also provided with an arcing horn, but it is hidden from view in the figures.

The auxiliary switches 34, 36 and 38 contain electrically conductive hook arms 34a, 36a and 38a, respectively, which are rigidly attached to the corresponding switch blades 28a, 30a and 32a. The attachment of the hook arms to the switch blades electrically interconnects each arm with the corresponding blade. The auxiliary switches also comprise electrically conductive interrupter operating members 34b, 36b and 38b which are disposed for engagement with the corresponding hook arms 34a, 36a and 38a during operation of the switching mechanism to be described fully hereinafter.

Figures 2, 3:
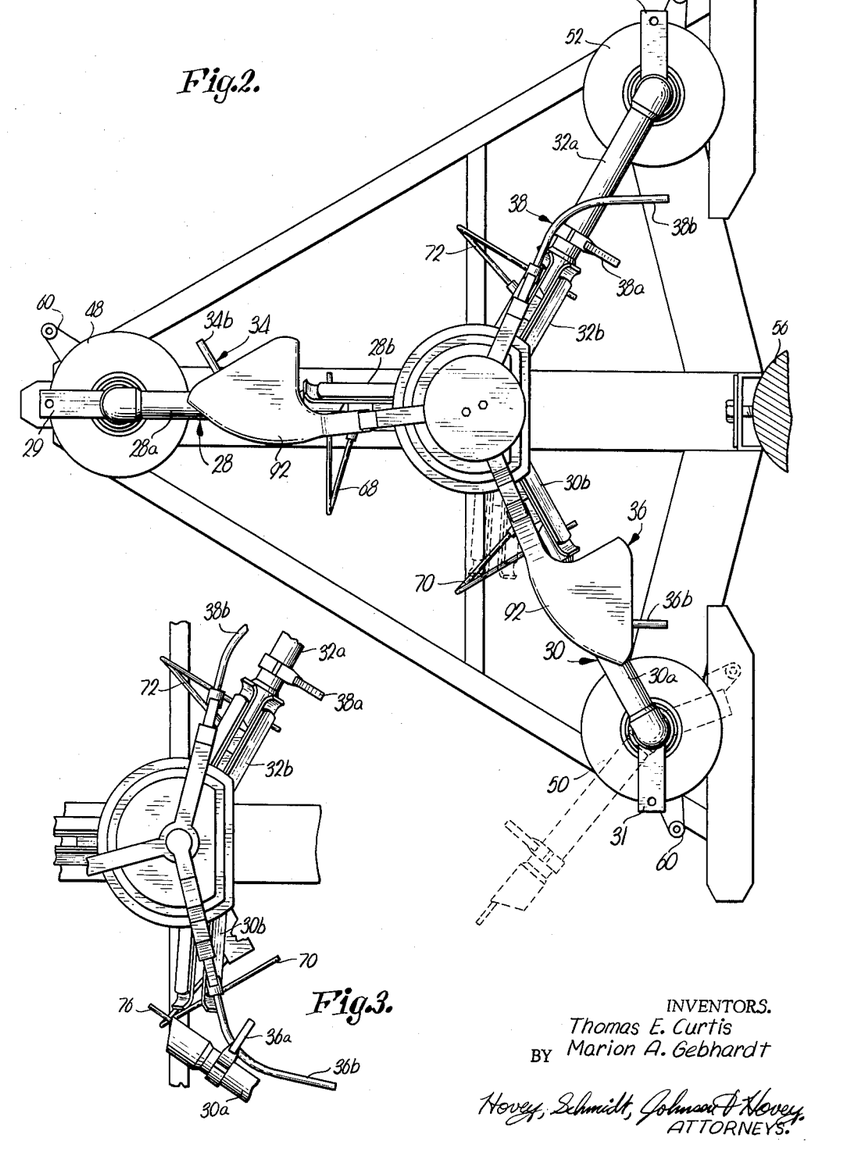
FIG. 2 is a plan view with one of the weather shields removed to reveal the underlying air-break switch structure, and with the fully open position of one of the air-break switches shown in dashed lines.
FIG. 3 is a fragmentary, plan view showing one of the air-break switches in the closed position and another of the air-break switches in a partially opened condition.

The load interrupter 40 is also secured to the support insulator 66 along with the mounting plate 64. At the uppermost extremity of the load interrupter, a toggle mechanism 78 is disposed for actuating the load interrupter. A pair of concentric shafts extend upwardly from toggle mechanism 78. Operating member 36b is connected to one of these shafts while operating members 34b and 38b are connected to the other shaft for movement in a horizontal plane. The details of this construction will be discussed later in this specification when the load interrupter and its associated toggle mechanism are discussed. In the description of the operation of the auxiliary switches, it is sufficient at this point to merely understood that the operating members forming a part of the auxiliary switches are coupled with the load interrupter in a manner to permit actuation of the load interrupter to separate its contacts and thus open the circuit therethrough when any one of the operating members are moved in a horizontal plane in the direction of the arrows as shown in FIG. 2.

Figure 11:
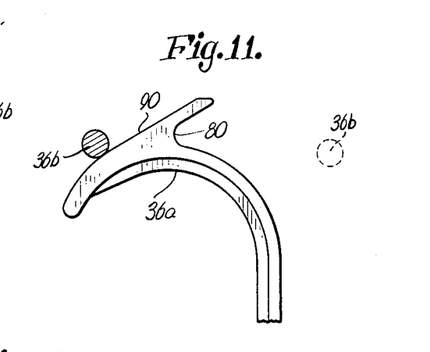
FIG. 11 is a fragmentary view of a hook arm of an auxiliary switch.

When all of the main switches are closed, as illustrated schematically in FIG. 14, the hook arms are disengaged from their respective operating members so that there is no electrical interconnection between the switch blades of the main switches and the operating member of the corresponding auxiliary switch. Assuming that it is desired to open main switch 30 as previously discussed, an operator on the ground would actuate the operating means coupled to the crank 60 of main switch 30 and effect rotation of switch blade 30a in the direction illustrated in FIG. 2. As this motion commences, the hook arm 36a engages operating member 36b. Referring to FIG. 11, it may be seen that the hook arms contain hooked portions 80 for engagement with the operating member during the opening of the main switch. The operating member is thus positively engaged by hook portion 80.

Due to the swinging movement of the contact jaw 30b, the hook arm 36a is allowed to engage member 36b and thereby close the auxiliary switch prior to the opening of main switch 30. After such engagement, the switch blade 30a continues its rotation until it becomes disengaged from contact jaw 30b and only its arcing horn 76 remains connected with jaw 30b through rod 70. This position is illustrated in FIG. 3. It should be appreciated that during this movement the operating member is constantly being advanced such that the shaft of the toggle mechanism 78 with which it is connected, is being rotated.

FIG. 4 illustrates further motion of switch blade 30a showing that the arcing horn 76 has now become disengaged with rod 70 and the hook arm 36a is nearing a point at which it will be rotated to a position free of member 36b. At this point the member 36b has been rotated a sufficient distance such that separation of the contacts within the load interrupter 40 has been effected and the circuit from line 22 to line 24 has been interrupted. Further movement of switch blade 30a will disengage the hook arm and oprating member to open the auxiliary switch 36, at which time operating member 36b will return to its initial position due to a return mechanism within the toggle mechanism 78 to be described fully hereinafter. This leaves the structure in the position as illustrated in FIG. 2 by the dashed lines.

Figure 10:
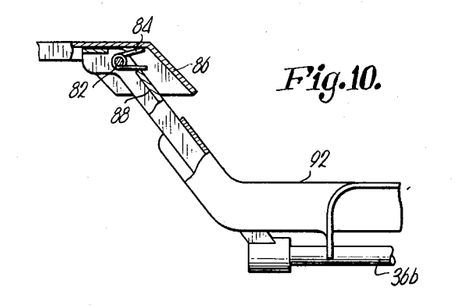
FIG. 10 is a fragmentary view of an interrupter operating member and associated structure.

Referring to FIG. 10, it may be seen that the operating members of the present invention are provided with a hinge pin 82 for allowing movement thereof in a generally vertical plane while maintaining the member rigid during movement in the horizontal plane. A spring 84 bears against the underside of an elongated housing 86 and also bears against a flange 88 on the movable portion of the operating member. The action of spring 84 tends to maintain the operating member in the position as shown.

Referring to FIG. 11, it may be seen that the hook arms are provided with an inclined surface 90. During closing of the main switch it may be appreciated that the hook arm connected to the switch blade must be allowed to resume the position shown by the solid lines in FIGS. 1 and 2 so that the hooked portion 80 will be disposed to positively engage the corresponding operating member when it is again desired to open that particular main switch.

FIG. 11 illustrates the manner in which this is accomplished without the necessity for close manufacturing tolerances for either the hook arms or the operating members. The solid lines in FIG. 11 portray the positions of hook arm 36a and member 36b at the instant of engagement during return of switch blade 30a to the closed position. At this time, the inclined surface 90 allows the operating member to ride upwardly therealong due to the vertical movement permitted by hinge pin 82 and the yield of spring 84. Once the operating member has reached the summit of the inclined surface, the member then falls back to its original position under the bias of spring 84. The dashed line representation of member 36b in FIG. 11 illustrates the relative positions of member 36b and hook arm 36a once the fully closed position of main switch 30 is reached. It should be understood that the dual representation of member 36b in FIG. 11 is not intended to show a shift in the position of member 36b. Furthermore, it should be understood that the operation of the other main and auxiliary switches is identical to that described above for main and auxiliary switches 30, 36.

Figure 15:
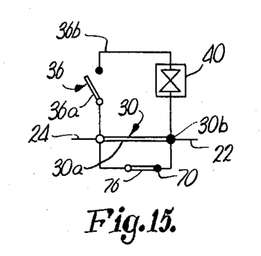
FIGS. 15–20 inclusive illustrate the sequence of operation of the present invention commencing with an initially closed air-break switch and ending with the air-break switch in the full open position and the load current interrupted.

The electrical significance of the operation of the main and auxiliary switches described above may be more fully understood by reference to FIGS. 15–20. These figures illustrate diagrammatically the operating sequence of the switch gear commencing at the closed position of the main switch and ending at the fully open position of the main switch. At the outset, FIG. 15 illustrates that the main switch 30 is closed, the arcing horn 76 is in engagement with rod 70, auxiliary switch 36 is open, and the load interrupter 40 is closed.

Figure 16:
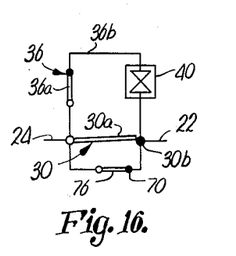
Figure 17:
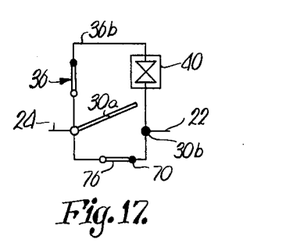

As the main switch blade 30a is actuated, FIG. 16 portrays the closing of auxiliary switch 36 prior to switch blade 30a becoming completely disengaged with its contact jaw 30b. In FIG. 17, the main switch blade is no longer engaged with its contact jaw, but the arcing horn 76 remains in contact with rod 70. This corresponds to the position of the switch structure shown in FIG. 3. The arcing horn maintains a parallel path across the main switch after the switch opens to prevent burning of the main current transfer surfaces when the blade becomes separated from its jaw contact. This is the conventional function of arcing horns.

Figure 18:
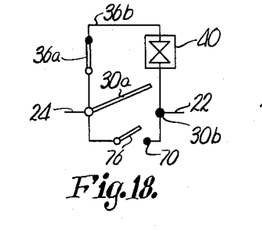
Figure 19:
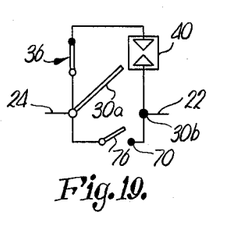
Figure 20:
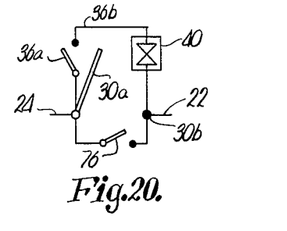

In FIG. 18, the arcing horn 76 is disengaged from rod 70 as blade 30a continues its path of travel. In FIG. 19, further movement of the blade has shifted the interrupter operating member 36b to a point where the load interrupter 40 is tripped, thus breaking the load current. This corresponds to the position of the switch components shown in FIG. 4. Load interruption does not occur until the blade is safely past the restrike-distance to its contact jaw. FIG. 20 illustrates the completed isolation of line 22 from line 24. At this final, completely open position, the hook arm 36a has become disengaged from operating member 36b and the return mechanism has shifted member 36b to its original position reclosing the contacts of the load interrupter. This leaves the load interrupter in a position to be operated by another main switch to thus perform the same steps as above through actuation by the interrupter operating arm corresponding to the main switch of the subsequent operation. It may be noted that weather shields 92 are secured to the operating members in overlying relationship thereto to shield the contact surfaces of the members and the contact surfaces of the hook arms from inclement weather conditions. In FIG. 10 a shield is shown connected to the upwardly extending portion of an operating member. The shield may be secured to the member by machine screws or other suitable means.

*The load interrupter*

Figure 7:
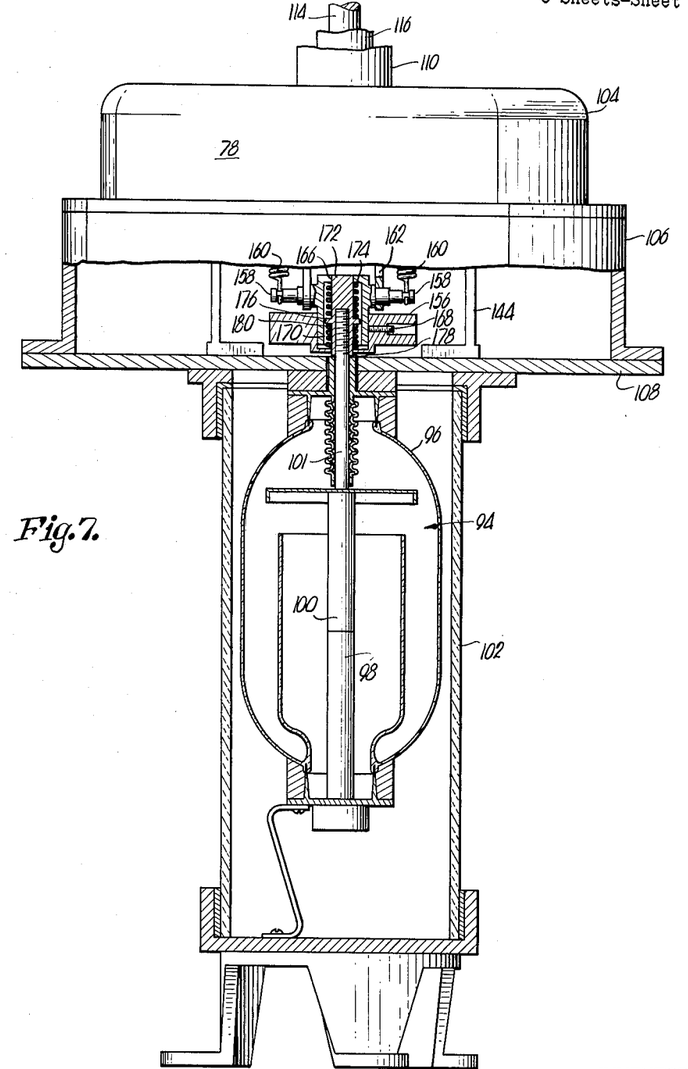
FIG. 7 is a view partially in section and partially in elevation showing a vacuum-break interrupter and the toggle mechanism therefor.

In FIG. 7, a vacuum-break load interrupter, generally designated 94, is shown comprising an evacuated envelope 96, a rigid contact 98, and a movable contact 100 connected with an operating shaft 101. The interrupter is housed in an insulated jar 102 which may be filled with a dielectric material such as polyurethane foam to prevent the condensation of moisture within the jar and a possible resulting electric flashover within the jar and external of the envelope upon opening of the switch contacts. For further information generally regarding vacuum-break interrupters of this type, reference is made to the aforesaid patent.

Figures 5, 6:
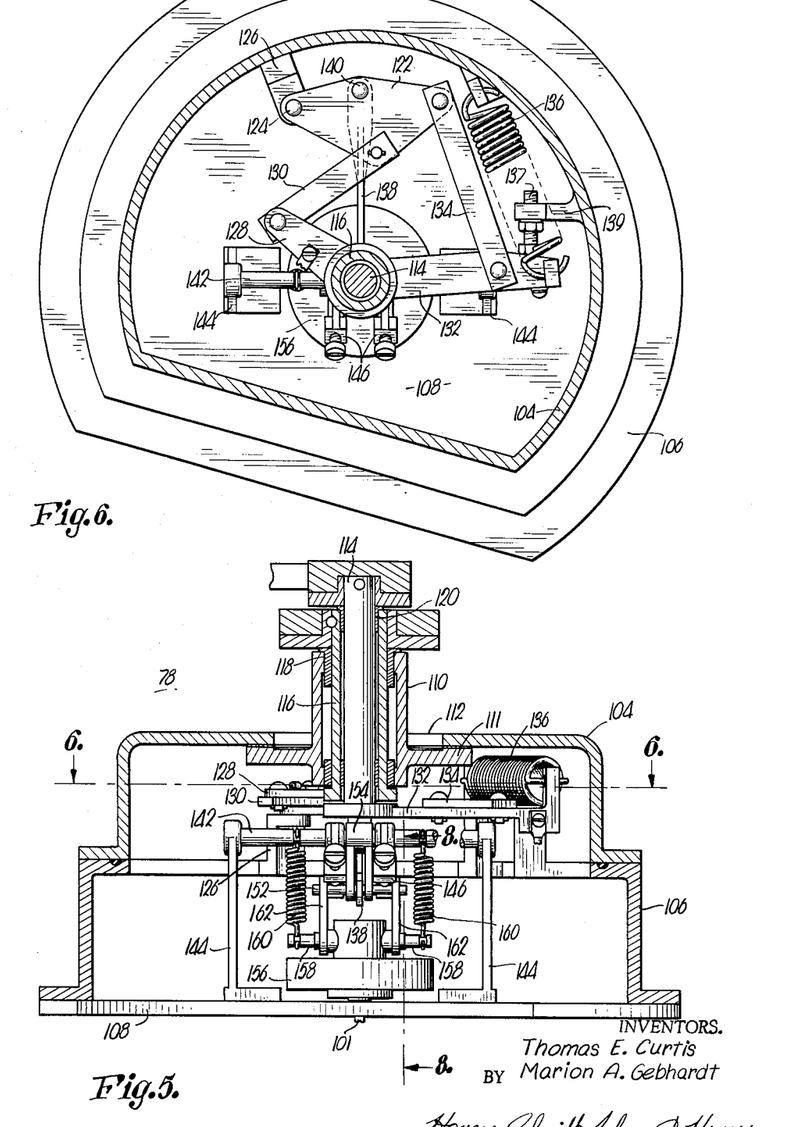
FIG. 5 is a partial elevational and partial sectional view of the toggle mechanism for operating the load breakers shown in FIGS. 7 and 12.
FIG. 6 is a sectional view taken along line 6—6 of FIG. 5.

FIG. 5 shows the toggle mechanism utilized to open and close the contacts of the vacuum-break interrupter. A cap 104 is rigidly secured to a housing 106 which is, in turn, centrally disposed above the vacuum-break interrupter on a mounting plate assembly 108. The disposition of the mounting plate assembly with respect to the jar 102 encasing the vacuum-break interrupter may be seen in FIG. 7.

A collar 110 projects upwardly through a central opening 112 in the top cap 104. Collar 110 is provided with a laterally extending, annular flange 111 which is secured to cap 104 by suitable means such as bolts or the like. Within the collar are a pair of concentric shafts 114 and 116. Shaft 116 is the outer shaft and is journalled within the collar by a washer and bushing assembly 118. Inner shaft 114 is similarly journaled within shaft 116 by washer and bushing assembly 120. The uppermost extremity of operating member 36b is rigid with the hub at the uppermost extremity of inner shaft 114, while the remaining pair of operating members are rigid with the hub at the uppermost end of outer shaft 116. A pair of shafts 114 and 116 are provided for the three operating members because member 36b rotates in a direction opposite to members 34b and 38b. Therefore, means must be provided to transmit the movement of any of the operating members into an actuating motion that will properly operate the toggle mechanism.

To this end, FIG. 6 reveals a bell crank 122 which is pivoted about a pivot pin 124 in a clockwise direction as viewed in the figure when any of the operating members are actuated by their corresponding hook arms during opening of any of the main switches. Pivot pin 124 journals the bell crank to a supporting member 126 which is rigidly secured to the housing 106. Interconnection of the outer shaft 116 to the bell crank is effected by a laterally extending arm 128 rigid with shaft 116 and pivotally connected to link 130 at one end thereof. The opposite end of link 130 is pivotally connected to the bell crank 122. The inner shaft 114 extends downwardly clear of the outer shaft and is provided with a laterally extending arm 132 rigid therewith and pivotally attached to link 134 at one end thereof. The opposite end of link 134 is pivotally mounted to the bell crank, thus completing the linkage between the two shafts and crank 122. A return spring 136 is utilized to hold the crank mechanism in the position shown in FIG. 6 unless actuated by the opening of one of the main switches. One end of spring 136 is rigidly secured to the housing 106, while the opposite end thereof interconnects with the outermost end of arm 132. A bolt and nut 137 is threadably received by a support member 139, the head of the bolt engaging arm 132 to provide stop means for limiting the path of travel of arm 132 and its associated structure under the action of return spring 136.

Figure 8:
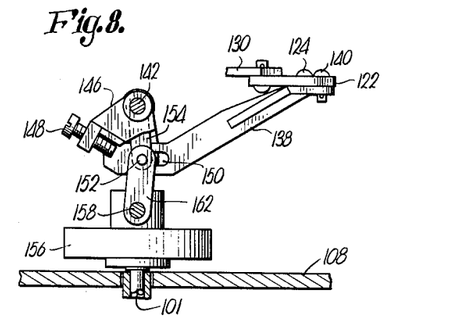
FIG. 8 is a sectional view taken along line 8—8 of FIG. 5 showing a portion of the toggle mechanism prior to load interruption.

A downwardly depending actuating member 138 is connected to bell crank 122 by a pin 140 for transmitting the motion of the bell crank to the heart of the toggle mechanism. In FIG. 8, member 138 is clearly shown, the position there indicated being the normal position thereof prior to actuation by the bell crank and its associated structure.

Figure 9:
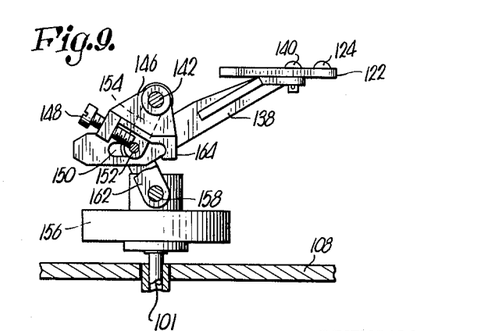
FIG. 9 is a sectional view taken along line 8—8 of FIG. 5 showing a portion of the toggle mechanism subsequent to actuation of the load interrupter to break the flow of electrical current therethrough.

Referring now to FIG. 5, a shaft 142 is shown rigidly mounted to pedestals 144 which are secured to the mounting plate assembly 108. In FIGS. 8 and 9, the shaft 142 is shown in transverse section. A pair of generally triangularly shaped members 146 is rigidly secured to shaft 142. Only one of the members 146 can be seen in FIGS. 8 and 9. The members 146 are each provided with a setscrew 148 which, in combination with pin 152 and an elongated slot 150 in member 138, comprises a lost motion mechanism for the actuating member 138.

A bifurcated toggle linkage 154 interconnects shaft 142 and pin 152. One end of linkage 154 is pivotally mounted on shaft 142 between the members 146. The other end thereof is pivotally attached to pin 152, the actuating member 138 being disposed between the bifurcations. Shaft 101 extends downwardly from a weight or inertia mass 156 which is provided with a pair of laterally extending stub shafts 158 in a manner to be described hereinafter. Each stub shaft 158 is connected to one end of a toggle spring 160. The opposite end of each toggle spring 160 is connected with shaft 142. A pair of toggle links 162 pivotally interconnects the ends of pin 152 with the corresponding stub shafts 158.

Actuation of member 138 by bell crank 122 moves the member leftwardly from the position shown in FIG. 8 to the position shown in FIG. 9 wherein the right-hand edge of slot 150 engages pin 152, the pin 152 then moving leftwardly with the member 138 until it engages setscrew 148. The toggle springs 160 are normally maintained under tension in the position as shown in FIGS. 5 and 7. Therefore, it may be appreciated that when the actuating member 138 is moved leftwardly by bell crank 122, and the motion of the lost motion mechanism is taken up, the linkage 154 and links 162 are pushed leftwardly from the position shown in FIG. 8 until they are slightly off center, at which time springs 160 will cause rapid upward movement of shaft 101 and inertia mass 156, thus separating the interrupter contacts. This upward movement will continue until pin 152 engages setscrews 148 as shown in FIG. 9.

Re-closing of the interrupter contacts is effected by the action of return spring 136 following the disengagement of the hook arm and operating member of the auxiliary switch actuated during the load interrupting operation. Return spring 136 through the linkage of the bell crank 122 moves actuating member 138 to the right thus returning shaft 101 and inertia mass 156 to their original positions shown in FIG. 8. Further rightward movement, and thus re-opening of the interrupter contacts, is prevented by the stops 164 on members 146 which engage pins 152.

Referring to FIG. 7, it may be seen that the inertia mass 156 has a central opening therein for receiving a collar 166. Mass 156 and collar 166 are rigidly secured together by means of a setscrew 168. It may be noted that the stub shafts 158 are integral with collar 166 and extend laterally outwardly therefrom.

Collar 166 is provided with a bore 170 which receives an insert 172. The uppermost portion of bore 170 is reduced in diameter to slidably fit the insert 172 while the remainder of bore 170 is enlarged to provide a space between the insert and the bore. In this space, a spring 174 is disposed between the restricted portion of the bore and an annular ring 176 integral with insert 172. The lowermost portion of inertia mass 156 contains an aperture 178 therein for receiving the lowermost extremity of insert 172 and for allowing vertical movement of the insert. Since aperture 178 is of smaller diameter than bore 170, a shoulder is formed permitting a spring 180 to be disposed between ring 176 and the inner surface of mass 156 surrounding aperture 178.

Insert 172 is provided with internal threads for receiving shaft 101 and rigidly securing the latter to the insert. It may be appreciated that the shaft 101 is thus held to collar 166 and inertia mass 156 only by the opposing pressures of springs 174 and 180. The purpose of this suspension is twofold. First, the spring 174 assures contact pressure backed by resilient means when the vacuum-break switch contacts are closed. Second, spring 180 provides a means through the use of resiliency to prevent undue initial acceleration of the movable contact 100 during opening of the vacuum-break switch. Without such a means as spring 180, the contacts tend to bounce open when force is suddenly applied by toggle springs 160.

It has been found in the operation of vacuum-break load switches that rapid acceleration of the contacts upon opening of the switch must be prevented in order to prevent the generation of a high voltage transient. The generation of such a transient occurs especially when currents of relatively small value and at a low power factor are interrupted. In such cases, interruption of these currents sometimes occurs prior to the current reaching a zero value.

A method of overcoming these undesirable transients consists of controlling the rate of contact separation so that from the instant opening of the contacts is initiated, a time duration equal to one-half cycle elapses before the contacts separate sufficiently to withstand the recovery voltage across them when interruption occurs. This acceleration can be controlled in accordance with the well-known law:

$$a = F/m$$

where $a$ = the contact acceleration,
$F$ = force applied to the movable contact, and
$m$ = the mass of the movable contact.

The combination of correctly proportioned toggle links, the proper tension for toggle springs 160, the correct value of inertia mass 156, and a properly selected spring 180 enables the acceleration to be adjusted to provide optimum operation of the vacuum-break switch during interruption.

*Tandem operation of the vacuum-break interrupter units*

Figure 12:
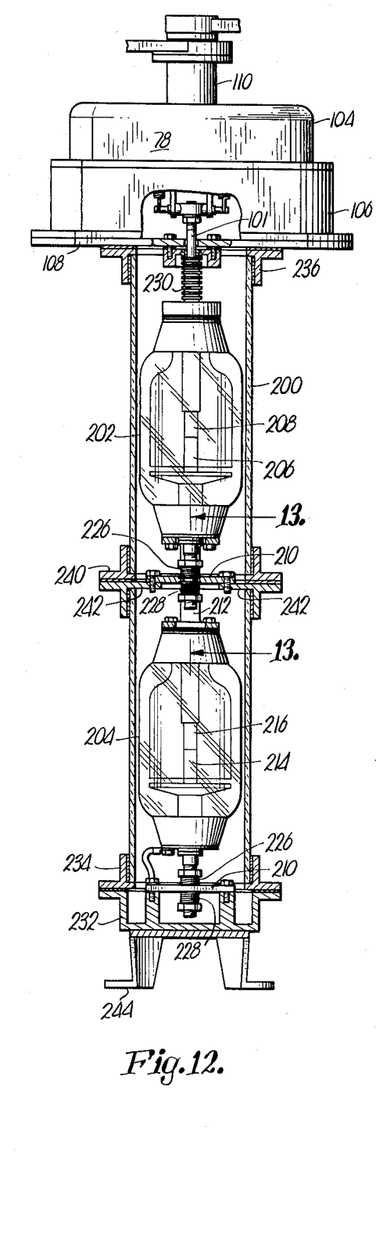
FIG. 12 is a view partially in section and partially in elevation showing a tandem arrangement of vacuum-break interrupters.
Figure 13:
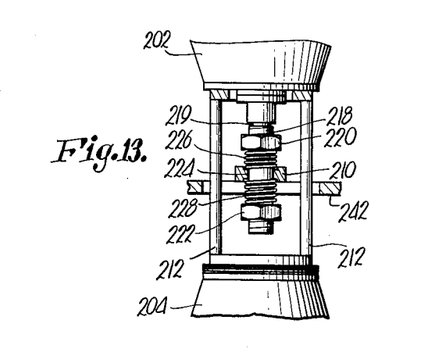
FIG. 13 is a sectional view taken along line 13—13 of FIG. 12.

FIGS. 12 and 13 show apparatus enabling the tandem operation of any number of vacuum-break interrupters to thereby enable operation of the interrupters at any desired transmission line voltage. The interrupters are electrically connected in series as well as placed in end-to-end relationship as illustrated. By employing individual interrupters of like electrical characteristics, operation at transmission line voltages equal to the rated voltage for a single interrupter multiplied by the total number of interrupters in tandem is achieved.

The apparatus interconnecting the individual interrupter units comprises an insulated housing 200 of generally cylindrical configuration which contains a pair of interrupter units 202 and 204. It should be understood that although only two interrupter units are shown in FIG. 12, any number of units may be disposed in end-to-end relationship in the housing 200. The manner of effecting this will be fully described in the succeeding paragraphs.

The units 202 and 204 are disposed in the housing 200 in a manner opposite to that which would be normally expected. The movable contact 206 of unit 202 is not connected to the toggle mechanism 78 but, instead, the envelope of unit 202 is connected to the toggle mechanism by means of shaft 101. The stationary contact 208 of unit 202 which is rigid with the envelope now becomes the movable contact in the arrangement shown in FIG. 12, while the normally movable contact 206 becomes the stationary contact. This is effected by securing the movable contact 206 to a plate member 210 which extends transversely of the housing 200. The disposition of member 210 is shown clearly in FIG. 13 where it may be seen that hte member is narrower than the diameter of housing 200. This enables a pair of columns 212 to be utilized to rigidly interconnect the envelope of unit 202 with the envelope of unit 204. Unit 204, therefore, is disposed such that its normally movable contact 214 also now becomes the stationary contact, while its normally rigid contact 216 moves whenever units 202 and 204 are actuated by the toggle mechanism.

Referring to FIG. 13, it may be seen that an externally threaded shaft 218 is rigid with and extends downwardly from the operating shaft 219 of the normally movable contact of unit 202 and receives a pair of nuts 220 and 222. A central aperture 224 in member 210 slidably receives an unthreaded portion of shaft 218. The central aperture 224 is counterbored so that annular shoulders are formed enabling a spring 226 to be held in compression between nut 220 and the normally uppermost shoulder and enabling a spring 228 to be held in compression between nut 222 and the normally lowermost shoulder. Structure essentally identical to that shown in FIG. 13 is also employed to secure the normally movable contact 214 of unit 204 to the housing. It may be appreciated that springs 226 and 228 are disposed to yield in directions co-linear with the line of travel of the envelopes and their rigid contacts. Springs 226 therefore, provide resilient contact pressure when the contacts of the units are closed, while springs 228 prevent bounce and undue initial contact acceleration during separation of the contacts upon switch opening.

It may be noted in FIG. 12 that the inertia mass used for the single interrupter unit of FIG. 7 is not shown. In the tandem configuration filling the housing 200 with dielectric fluid such as oil eliminates the need for an inertia mass. In effect, the viscosity of the fluid replaces the inertia of the weight. The fluid also prevents condensation of moisture within the housing and floats the interrupter units, the resulting buoyancy reducing operating effort. Furthermore, the fluid contributes to the ease of handling of the tandem configuration as it dampens vibrational shock on the glass envelopes of the interrupter units during shipment.

It may be noted that a resilient sleeve or bellows assembly 230 surrounds shaft 101 after it enters the interior of the housing. This provides a resilient seal to prevent escape of the dielectric fluid around shaft 101 both while static and during motion thereof.

Since the housing is composed of insulating material, a metallic cap 232 forms a terminal at the lowermost end thereof. Cap 232 is provided with an annular flange 234 which receives the lowermost extremity of the housing. A suitable sealing substance is utilized between the housing and the flange. Similarly, an annular flange 236 is employed at the uppermost extremity of the housing along with a suitable sealing substance to secure the upper end of the housing.

To provide a rigid mount for member 210 between units 202 and 204, a flange structure 240 is utilized. A pair of mounting ears 242 integral with structure 240 extends through to the interior of the housing. The ends of the member 210 are secured to the ears by bolts or other suitable means. A sealer is utilized between flange structure 240 and the housing to assure that the housing is maintained air-tight. Feet 244 form a support base for the assembly.

Having thus described the invention, what is claimed as new and desired to be secured by Letters Patent is:

1. Swith gear for interconnecting a plurality of electrical power transmission lines comprising:
   a main switch adapted to be operably interposed in each of said lines and each having a contact jaw and a switch blade movable out of engagement with the respective contact jaw;
   auxiliary switch means for each of said main switches, each auxiliary switch including an elongated, electrically conductive arm secured to and movable with the corresponding switch blade and an electrically conductive operating member;
   load interrupting switch structure having a pair of terminals and selectively operable means defining an electrically conductive path therethrough between said terminals and operable to open and close said conductive path;
   conductor means electrically connecting one of the terminals of said switch structure with each of said operating members and connecting the other terminal with each of said contact jaws,
   said operating members being coupled to said selectively operable means for effecting opening and closing of the conductive path through said switch structure upon movement of any of the operating members, a contact segment of each operating member normally being within a portion of the path of travel of the respective arm for moving the operating member in response to shifting of the switch blade of the corresponding main switch, each operating member clearing the respective arm and returning to substantially the initial disposition thereof prior to the switch blade of the corresponding main switch completing its path of travel during opening thereof, the operating members and respective arms having mutually cooperable, interengageable surfaces;
   means mounting the operating members for swinging movement in a direction away from corresponding arms in response to engagement of said surfaces during return motion of the switch blades whereby the operating members clear the arms during said return motion so that close tolerances between the relative locations of the arms and the operating members are not required; and
   means coupled with said switch blades for opening and closing a selected main switch, whereby during opening of a selected main switch the corresponding auxiliary switch is first closed by engagement of its arm and operating member, the shifted switch blade then moves out of engagement with its contact jaw and finally, the operating member effects opening of the conductive path through said switch structure.

2. The invention of claim 1 said mounting means including hinge means coupling each operating member respectively with said selectively operable means, the surface of each arm being inclined with respect to said path of travel thereof to bias the corresponding member in a direction generally perpendicularly of said path of travel during said return motion.

3. The invention of claim 1, said selectively operable means of the switch structure including:
   a plurality of vacuum-break interrupters, each comprising an envelope and a pair of separable contacts within said envelope, one of said contacts being rigid with said envelope, the other contact being normally movable with respect to the envelope;
   means maintaining said normally movable contacts substantially stationary;
   means interconnecting said envelopes for movement to and from a position where said rigid contacts and normally movable contacts are engaged; and
   means electrically connecting said interrupters in series between said pair of terminals, with the normally movable contact and the rigid contact of respective adjacent interrupters electrically intercoupled, said members being operably coupled with said envelopes for shifting the latter toward and away from said position.

4. The invention of claim 1, wherein is provided an electrically conductive element coupled with each jaw respectively, and an arcing horn secured to each blade respectively and engaging a corresponding element when the associated main switch is closed, each horn being disposed to slide along the corresponding element to a disposition out of engagement therewith during opening of the associated main switch.

5. In a plurality of electrical power transmission lines interconnected at a junction wherein a main switch is employed in each of at least two of the lines along with a single load interrupting switch means for all of the lines, each main switch having a contact jaw and a switch blade movable out of engagement with the jaw when the main switch is opened, the load switch means having a pair of terminals and selectively operable means defining an electrically conductive path therethrough between said terminals and operable to open and close said path, one of said terminals being electrically connected to each contact jaw, the combination with the switch blades and the selectively operable means of:

an electrically conductive, elongated arm secured to and movable with each switch blade respectively;

electrically conductive operating members operably associated with respective arms and coupled with the selectively operable means for effecting opening and closing of said conductive path upon movement of any of the members, a contact segment of each member normally being in the path of travel of the corresponding arm for engagement thereby and movement therewith during opening of the associated main switch, each arm having a surface thereon for engaging the corresponding member during closing of the associated main switch; means mounting each member for swinging movement in a direction away from the corresponding arm to clear the latter in response to engagement by said surface; and conductor means connecting the members with the other terminal.

6. The invention of claim 5, said surface of each arm being disposed at an angle with respect to the path of travel thereof.

7. The invention of claim 5, said mounting means including hinge means coupling each member respectively with said selectively operable means to thereby permit said swinging movement away from respective arms.

8. The invention of claim 7, each of said hinge means being provided with spring means in engagement with the associated member for normally maintaining the contact segment thereof in said path of travel of the corresponding arm.

9. The invention of claim 8, said surface of each arm being disposed at an angle with respect to said path of travel thereof.

10. Load interrupter apparatus comprising;

a housing having a pair of terminals thereon;

a plurality of vacuum-break interrupters in said housing, each comprising an envelope and a pair of separable contacts within said envelope, one of said contacts being rigid with said envelope, the other contact being normally movable with respect to the envelope;

means connecting said normally movable contacts to said housing to maintain the last-mentioned contacts substantially rigid with said housing;

means interconnecting said envelopes for movement to and from a position where said rigid contacts and normally movable contacts are engaged; and means electrically connecting said interrupters in series between said pair of terminals with the normally movable contact and the rigid contact of respective adjacent interrupters electrically intercoupled.

11. The invention of claim 10, said envelope interconnecting means including means rigidly interconnecting said envelopes.

12. The invention of claim 11, said housing comprising an elongated, insulated housing, said interrupters being disposed in said housing in end-to-end relationship.

13. The invention of claim 12, said means connecting the normally movable contacts to said housing comprising a member for each interrupter coupled with the respective contact and extending transversely of said housing.

14. The invention of claim 13, wherein is provided spring means connecting each member to the corresponding normally movable contact and disposed to yield in directions co-linear with the line of travel of said rigid contacts, said members being rigid with said housing whereby to provide resilient contact pressure when the contacts are engaged and to reduce initial acceleration of the rigid contacts when the latter are separated from the normally movable contacts.

15. The invention of claim 13, said housing being imperforate and containing a dielectric fluid whereby to prevent moisture condensation within the housing, reduce the initial acceleration of said rigid contacts when the latter are separated from the normally movable contacts, and dampen vibrational shock.

References Cited by the Examiner
UNITED STATES PATENTS 2,859,309 11/1958 Schwager et al. _______ 200—144
3,070,680 12/1962 McBride et al. _______ 200—48

KATHLEEN H. CLAFFY, *Primary Examiner.*

ROBERT K. SCHAEFER, *Examiner.*